United States Patent
Thienel et al.

(10) Patent No.: US 12,269,325 B2
(45) Date of Patent: Apr. 8, 2025

(54) DOOR ASSEMBLY WITH MOUNTING COMPONENT AND ASSEMBLY METHOD

(71) Applicant: Brose Fahrzeugteile SE & Co. Kommanditgesellschaft, Bamberg, Bamberg (DE)

(72) Inventors: Michael Thienel, Thurnau (DE); Dominik Hofmann, Baunach (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 616 days.

(21) Appl. No.: 17/263,647

(22) PCT Filed: Jul. 29, 2019

(86) PCT No.: PCT/EP2019/070328
§ 371 (c)(1),
(2) Date: Mar. 29, 2021

(87) PCT Pub. No.: WO2020/025525
PCT Pub. Date: Feb. 6, 2020

(65) Prior Publication Data
US 2021/0309083 A1 Oct. 7, 2021

(30) Foreign Application Priority Data

Jul. 30, 2018 (DE) .................. 10 2018 212 692.5

(51) Int. Cl.
*B60J 5/04* (2006.01)
*F16B 5/06* (2006.01)
(52) U.S. Cl.
CPC ........... *B60J 5/0469* (2013.01); *B60J 5/0468* (2013.01); *F16B 5/0621* (2013.01);
(Continued)

(58) Field of Classification Search
CPC ........ B60J 5/0469; B60J 5/046; B60J 5/0403; B60J 5/0413; B60J 5/0468; F16B 5/0612; F16B 5/0657; F16B 5/0664; F16B 5/126
See application file for complete search history.

(56) References Cited

U.S. PATENT DOCUMENTS 4,923,542 A * 5/1990 Janicki .................. B60J 5/0416
156/289
5,202,172 A * 4/1993 Graf ........................ F16B 5/123
24/297

(Continued)

FOREIGN PATENT DOCUMENTS

| CN | 101994736 A | 3/2011 |
| CN | 104564972 A | 4/2015 |

(Continued)

OTHER PUBLICATIONS

Machine Translation of DE19838560A1, printed from the EPO website, Apr. 21, 2023.*

(Continued)

*Primary Examiner* — Jason S Morrow
(74) *Attorney, Agent, or Firm* — Dickinson Wright PLLC

(57) ABSTRACT

A door assembly and an assembly method for a door assembly with a door skin, a support component and an interior trim component, the support component is fastened to the door skin by at least one mounting component. The at least one mounting component is also used for mounting the interior trim component since a head section of the mounting component projects from the support component and the interior trim component is mounted on the head section.

12 Claims, 4 Drawing Sheets

(52) U.S. Cl.
CPC ........... *F16B 5/0664* (2013.01); *B60J 5/0416* (2013.01); *B60J 5/0463* (2013.01)

(56) References Cited

U.S. PATENT DOCUMENTS

| | | | | |
|---|---|---|---|---|
| 6,431,585 | B1* | 8/2002 | Rickabus | B60R 21/216 |
| | | | | 280/730.2 |
| 6,899,373 | B2 | 5/2005 | Kim | |
| 7,059,659 | B2* | 6/2006 | Smith | B60J 5/0468 |
| | | | | 296/146.7 |
| 8,020,919 | B2 | 9/2011 | Lin et al. | |
| 8,776,438 | B2* | 7/2014 | Pleiss | E05F 11/382 |
| | | | | 49/502 |
| 10,723,207 | B2* | 7/2020 | Fischer | B60J 5/0455 |
| 2004/0150976 | A1* | 8/2004 | Chang | F16B 5/065 |
| | | | | 361/810 |
| 2006/0017306 | A1* | 1/2006 | Smith | B60J 5/0418 |
| | | | | 296/146.7 |
| 2006/0082187 | A1* | 4/2006 | Hernandez | B60J 5/0416 |
| | | | | 296/146.1 |
| 2006/0125286 | A1 | 6/2006 | Horimatsu et al. | |
| 2011/0041299 | A1 | 2/2011 | Onuma | |
| 2015/0101458 | A1 | 4/2015 | Saje et al. | |

FOREIGN PATENT DOCUMENTS

| | | | | |
|---|---|---|---|---|
| CN | 204692265 | U | 10/2015 | |
| DE | 1983560 | A1 | 3/2000 | |
| DE | 19914189 | A1 | 10/2000 | |
| DE | 102006002815 | A1 | 7/2007 | |
| DE | 102009059663 | A1 | 6/2011 | |
| EP | 1631468 | B1 | 1/2010 | |
| JP | 2002321570 | A | 11/2002 | |
| KR | 200156288 | Y1* | 9/1999 | ............ B60J 5/0468 |
| WO | 0011356 | A1 | 3/2000 | |

OTHER PUBLICATIONS

Machine Translation of WO0011356, printed from the EPO website Jul. 15, 2024 (Year: 2024).*
Chinese Office Action for CN 201980063432.8, Dated Mar. 31, 2023, English Translation attached to original, all together 16 Pages.
Examination Report for European Application No. 197492879, Machine Translation by Google attached to original, All together 8 Pages, Dated Oct. 20, 2022.

* cited by examiner

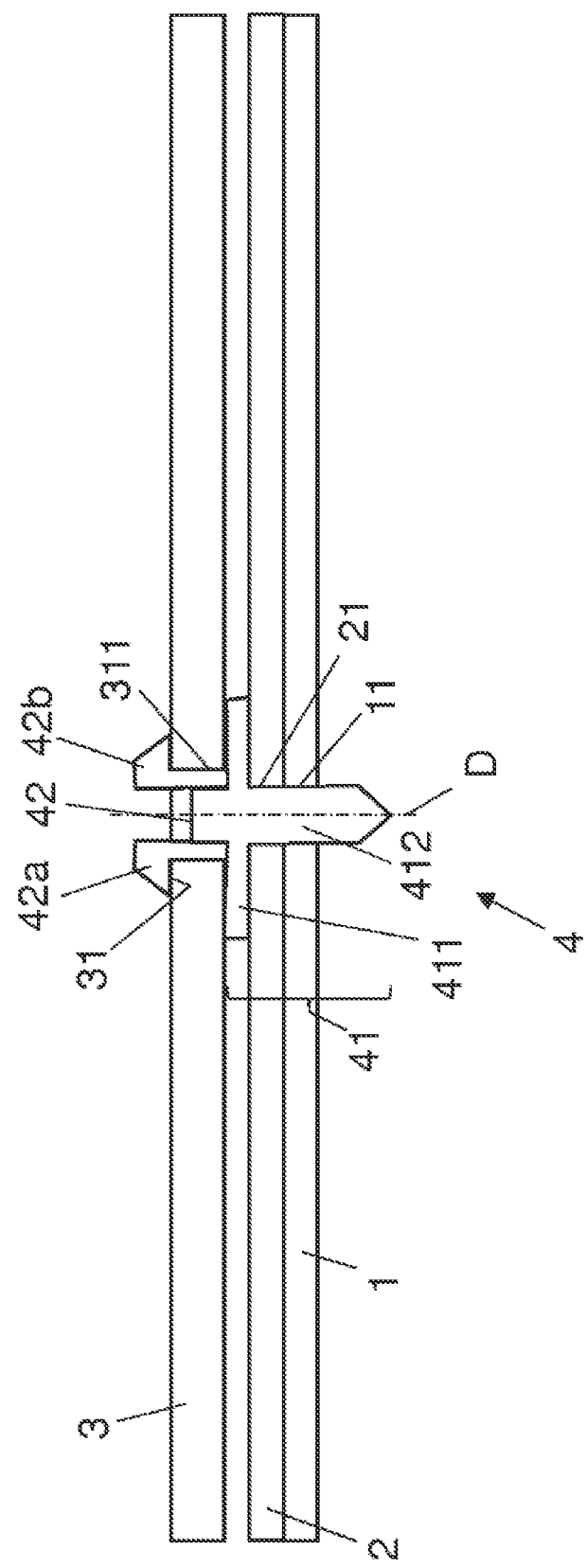

DOOR ASSEMBLY WITH MOUNTING COMPONENT AND ASSEMBLY METHOD

CROSS-REFERENCE TO RELATED APPLICATIONS

This application is the U.S. National Phase of PCT Application No. PCT/EP2019/070328 filed Jul. 29, 2019, which claims priority to German Patent Application No. DE 10 2018 212 692.5 filed Jul. 30, 2018, the disclosures of which are hereby incorporated in their entirety by reference herein.

TECHNICAL FIELD

The present disclosure relates to a door assembly for use in a motor vehicle.

BACKGROUND

A door assembly of the generic type may include, inter alia, a door skin which can be formed for example by a door inner panel. Provided on the door skin can be a carrier component, which is formed to carry at least one functional component to be arranged within a structural space formed in the motor vehicle. Such a carrier component can for example be a unit carrier for a motor vehicle door, on which unit carrier for example parts of a motor vehicle window lifter or at least one loudspeaker are mounted.

SUMMARY

The present invention may be based on one or more objects such as improving a door assembly that may include a sheet-like carrier component, and optimizing the attachment of the interior panel component.

Regarding a proposed door assembly, a carrier component having at least one mounting element is mounted on the door skin, and the at least one mounting element is also used to mount the interior panel component. In one exemplary embodiment, a plurality of mounting elements are arranged on a circumferential edge of the carrier component. As a result, maximum utilization of the surface of the carrier component is possible. For the purpose of mounting the interior panel component, the mounting element protrudes on the carrier component by way of a head portion. The interior panel component is fixed to the head portion. A mounting of the interior panel component on the at least one mounting element is made possible in this way.

For the purpose of being fixed to the head portion, the interior panel component may include for example a latching portion, with which the head portion can interact. For example, the latching portion can be mechanically latched to the head portion.

In one embodiment, the latching portion may include a receptacle which can be extendable. An extendable receptacle can make it possible to receive the head portion when the head portion is pressed against the receptacle. As an alternative, the receptacle can be rigid. When an extendable receptacle is provided, the head portion can be pressed against the extendable receptacle, with the result that the receptacle is extended until the head portion can pass the receptacle. After the head portion has passed the receptacle, the receptacle can narrow again. Expressed differently, the receptacle is formed to provide an enlarged passage opening by virtue of elastically flexible side walls during the passage of the head portion and, after the head portion has passed the receptacle, to return to an original state with a smaller passage opening.

A possible embodiment of the head portion is a head portion having a cross-sectional form which tapers toward the tip, such as for example a spherical form, conical form or frustoconical form. In order to produce a positively locking and/or non-positively locking connection between the head portion and the interior panel component, the cross-sectional form of the head portion can be T-shaped. Possible examples of a T-shaped cross-sectional form may include a mushroom-shaped and screw head-shaped embodiment of the head portion, wherein, in the case of the screw head-shaped embodiment, such as a spherical head or a cylindrical head can be used.

In an alternative exemplary embodiment, the at least one mounting element may include a (elastically) deformable head portion. A deformable head portion can be compressed at least locally when the head portion is pressed against the receptacle. As a result, the head portion can then pass the receptacle. That is to say, a diameter of the head portion perpendicular to the insertion direction into the receptacle can be smaller during the passage through the receptacle than in a state after the head portion has passed the receptacle and a latching is provided by way of the head portion.

In one exemplary embodiment, the head portion may include at least one latching element for latching the head portion to the interior panel component. The at least one latching element can be formed by a latching hook. Suitable latching hooks can be formed by plastic clips. In one embodiment, the plastic clips are molded onto the mounting element. In one embodiment with at least two latching elements, the at least two latching elements can be bent toward one another, with the result that the head portion is at least locally deformable. For this purpose, the at least two latching elements can be formed such that the at least two latching elements can be bent toward one another by the pressure created when the head portion is being inserted into the receptacle.

As an example, a diameter of the head portion perpendicular to the insertion direction can be reduced by bending the at least one latching element. As a result of the at least one latching element snapping back after passage through the receptacle, the head portion is then latched to the latching portion of the interior panel component.

In one exemplary embodiment, the at least one mounting element may include a shank portion which is connected in a positively locking and/or non-positively locking manner to the door skin. In order to allow a positively locking and/or non-positively locking connection to the at least one mounting element, the door skin can have at least one through-hole. By virtue of the through-hole, the shank portion can protrude through or into the door skin. By way of example, the shank portion can be screwed to the door skin. The shank portion can have a threaded portion with a thread in order to be screwed to the door skin, by way of which thread the threaded portion is screwed to the door skin.

In order to mount the carrier component with the at least one mounting element on the door skin, in a further exemplary embodiment the shank portion is formed to create an aperture in the carrier component. As a result, the aperture can be created at a suitable location in the carrier component when the carrier component is being mounted on the door skin. By way of example, the suitable location can be indicated by a marking on the carrier component. In terms of manufacture, creating the aperture during the mounting of the carrier component is more cost-effective and saves time to a greater degree than, for example, a prefabricated aperture.

For the purpose of creating the aperture in the carrier component, the shank portion can be formed with a sharp end which can puncture through the carrier component when the carrier component is being mounted on the door skin. It is similarly conceivable that the threaded portion is formed to create the aperture in the carrier component when the carrier component is being mounted on the door skin. The thread of the threaded portion can, for example, be in the form of a self-tapping thread.

The carrier component can bear against the door skin. The carrier component can similarly be fixed easily to the door skin in an immovable manner. By way of example, elements arranged on the shank portion can be used to a limited extent to fix the carrier component. The elements can be implemented, for example, by the thread of the threaded portion that interacts with an internal thread of the aperture. The elements can similarly be implemented by a change in the cross-sectional form of the shank portion along a connection axis between the door skin and the carrier component. By way of example, a shoulder can be formed on the shank portion. The shoulder can be positioned such that the carrier component with the one planar side bears against the shoulder and with the other planar side bears against the door skin. It would then be possible, for example, to fix the carrier component between the shoulder and the door skin by means of the mounting element.

As an example, in the case of a round cross-sectional form, the diameter of the shank portion along the connection axis proceeding from the threaded portion can be increased at a shoulder. The shoulder can run perpendicular to the connection axis. The shoulder can be formed annularly on the shank portion. In one exemplary embodiment, the shoulder is arranged along the connection axis on the threaded portion.

One or more embodiments relate to a method for assembling the door assembly, in which the carrier component is mounted on the door skin by way of the at least one mounting element. As an example, the interior panel component is mounted on the carrier component via the at least one mounting element, which is also used for mounting the carrier component on the interior panel component, by the interior panel component being fixed to a head portion of the at least one mounting element.

For the mounting of the interior panel component on the carrier component, the interior panel component can be connected in a positively locking and/or non-positively locking manner to the head portion of the at least one mounting element. By way of example, the interior panel component can be snapped into place on the head portion.

In another embodiment, the interior panel component is fixed to the head portion after the carrier component has been mounted on the door skin.

For the mounting of the carrier component on the door skin, an aperture can be created in the carrier component by means of the at least one mounting element. By way of example, the aperture can be created by means of one threaded portion of the at least one mounting element that has a self-tapping thread.

The proposed assembly method may be suitable for the assembly of a proposed door assembly. Features and advantages explained above and below for variant embodiments of a door assembly thus also apply for variant embodiments of an assembly method, and vice versa.

BRIEF DESCRIPTION OF THE DRAWINGS

The concept addressed by the invention is to be explained in more detail below on the basis of the exemplary embodiments illustrated in the figures,
in which:
FIG. 3A shows a sectional side view of a mounting element with a plastic clip which has been molded on;
and
FIG. 3B shows a perspective view of a mounting element with a plastic clip which has been molded on.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known door assembly is disclosed in U.S. Pat. No. 8,020,919 B2 and includes interior cladding component, which is generally mounted on the door skin by mounting means and conceals the functional components. An important quality feature for the optimal attachment of the carrier component is a small gap pattern between the interior panel component and the door skin.

For manufacturing reasons, a small gap pattern can only be achieved with considerable outlay, if it is not possible to attach the interior panel component to the door skin. This is the case for example for a sheet-like carrier component which covers the door skin. In this case, the interior panel component can be attached only to the carrier component. Since, however, the carrier component is attached to the door skin with a certain tolerance and the interior panel component in turn is attached to the carrier component with a certain tolerance, a summation of the tolerances takes place that enlarges the gap pattern under certain circumstances. As a result, the visual impression of quality of the door assembly is impaired.

Figure 1:
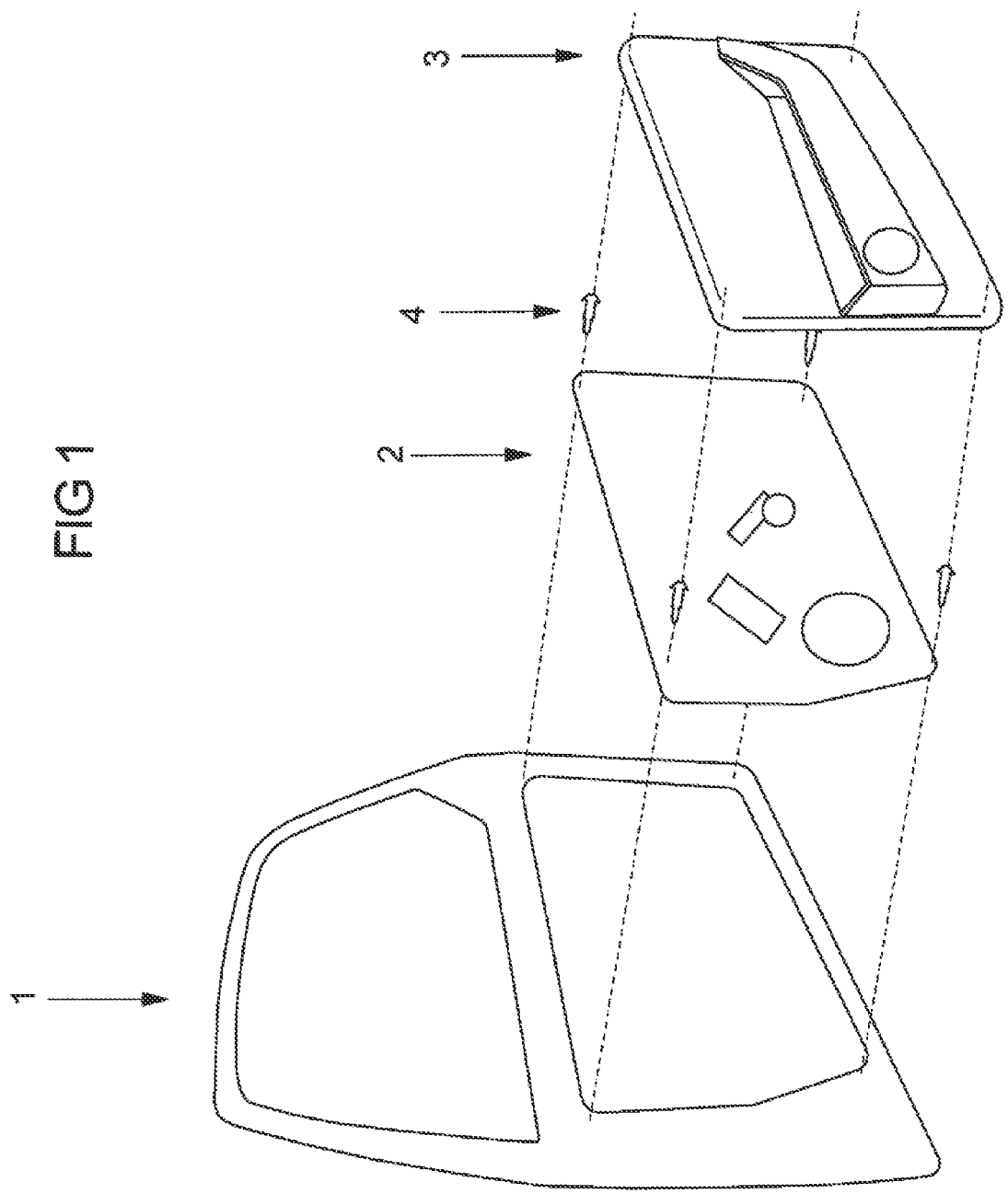
FIG. 1 shows an exploded illustration of a door assembly.

FIG. 1 shows a door assembly having a door skin 1, a carrier component 2 and an interior panel component 3, wherein the carrier component 2 is mounted on the door skin 1 by way of—in this embodiment—four mounting elements 4, which in this embodiment are arranged on a circumferential edge of the carrier component 2. To mount the carrier component 2 on the door skin 1, created on the carrier component 2 by means of the mounting elements 4 are apertures 21 which for example can be marked in advance on the carrier component 2. Subsequently, the mounting elements 4 are mounted on the door skin 1, with the result that the carrier component 2 is mounted on the door skin 1 by means of the mounting elements 4.

The interior panel component 3 is usually arranged after the carrier component 2 has been arranged on the door skin 1. As an example, when using a sheet-like carrier component 2, however, it is possible that a potential attachment surface for attaching the interior panel component 3 to the door skin 1 is concealed. It can furthermore be desirable to save on additional elements for arranging the interior panel component 3 on the door skin. According to one or more embodiments, the interior panel component 3 is therefore also mounted by means of the mounting elements 4.

To mount the interior panel component 3 on the mounting elements 4, the mounting elements 4 protrude from the carrier component 2 by way of a head portion 42, with which the interior panel component 3 is mechanically latched in the embodiment shown. Other positively locking and/or non-positively locking connections are, however, also conceivable and possible.

Figure 2:
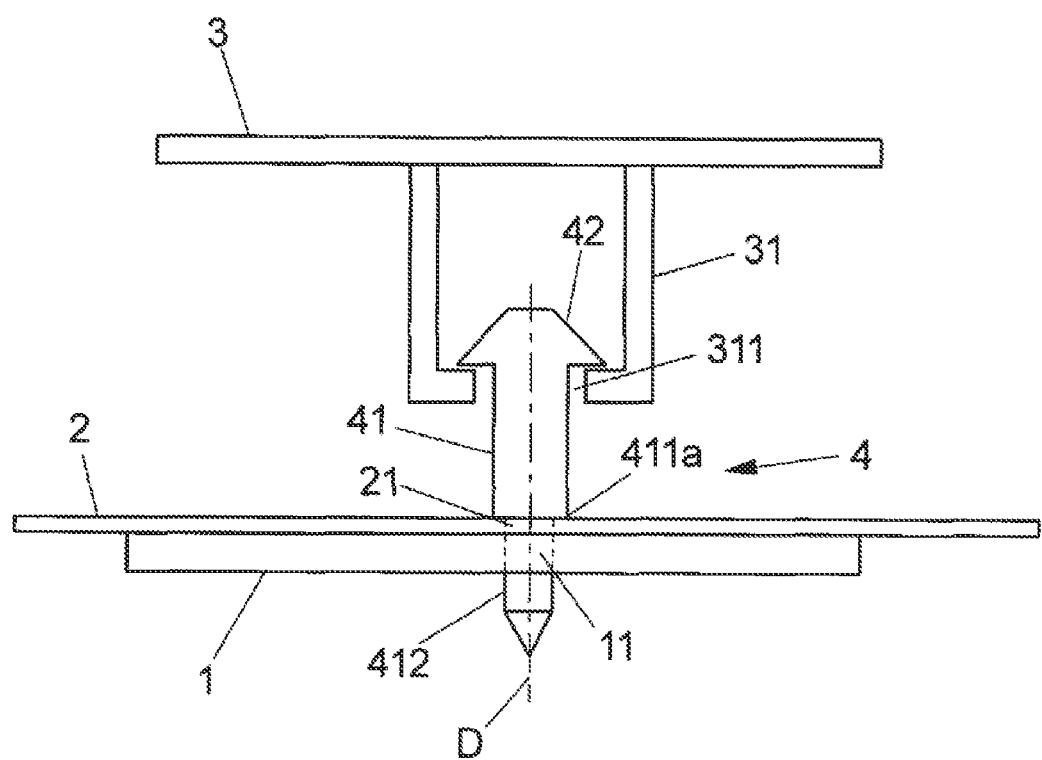
FIG. 2 shows a detail of FIG. 1 with a mounting element in cross section.

FIG. 2 shows a mounting element 4 which is used to mount a carrier component 2 and an interior panel component 3 on a door skin 1. To mount the interior panel component 3, the mounting element 4 may include a head portion 42, the tip of which has a frustoconical form. The interior panel component 3 may include a latching portion 31 for the purpose of being mounted on the head portion 42. The head portion 42 and the latching portion 31 act together to connect the interior panel component 3 and the mounting element 4.

For connection to the head portion 42, the latching portion 31 may include a receptacle 311, through which the head portion 42 protrudes into the latching portion 31. The frustoconical tip of the head portion 42 is arranged in the interior of the latching portion 31. Since the base area of the frustoconical tip is larger than the cross-sectional form of the receptacle 311, the head portion 42 and the latching portion 31 are mechanically latched to one another. Other embodiments of a positively locking connection or in general other positively locking and/or non-positively locking connections between the interior panel component 3 and the mounting element 4 are conceivable and possible.

The latching portion 31 and the head portion 42 can be joined together quickly and with a low expenditure of force by means of the frustoconical tip or a similar tapering tip. In one exemplary embodiment, when being inserted, the receptacle 311 extends as a result of the pressure of the conical casing of the frustoconical tip in a direction perpendicular to the insertion direction, with the result that the head portion 42 can be introduced into the latching portion 31.

Figure 3B:
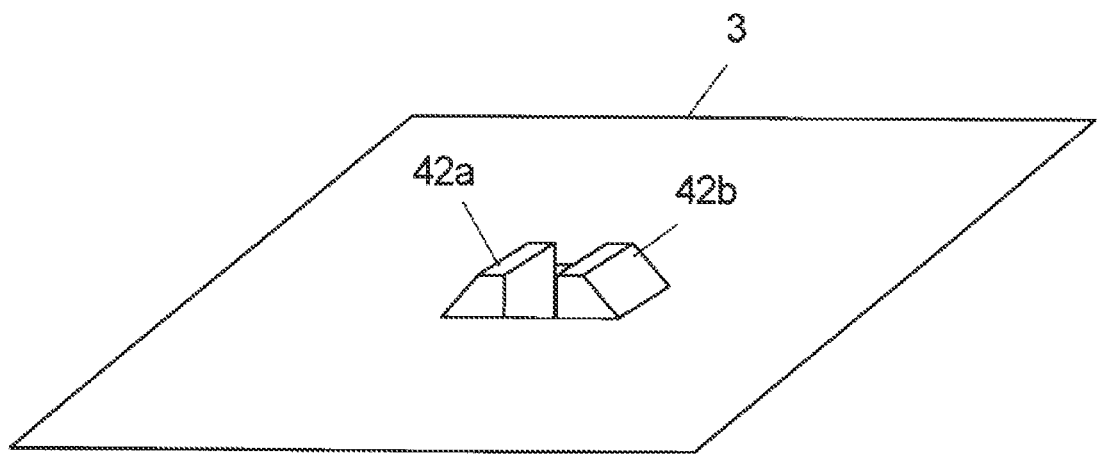

In the exemplary embodiment illustrated in FIGS. 3A and 3B, when the head portion 42 is being inserted into the receptacle 311, the head portion 42 is compressed under the pressure of the receptacle 311 in a direction perpendicular to the insertion direction, with the result that the head portion 42 can be introduced into the receptacle 311. The head portion 42 may include two bendable latching hooks 42a, 42b. The latching hooks 42a, 42b are formed by a plastic clip which has been molded on. When the head portion 42 is being inserted into the receptacle 311, the head portion 42 deforms in the region of the latching hooks 42a, 42b, i.e. the latching hooks 42a, 42b are bent toward one another. As a result, a diameter of the head portion 42 perpendicular to the insertion direction is reduced. After the passage through the receptacle 311, the latching hooks 42a, 42b can snap back again into the starting position. As a result, the head portion 42 latches to the latching portion 31 of the interior panel component 3.

A combination of an extendable receptacle 311 and a compressible or narrowable head portion 42 is similarly conceivable. In principle, the mounting element 4 can similarly have a latching portion having the features of the latching portion 31 and the interior panel component 3 can have a head portion having the features of the head portion 42.

The cross-sectional form of the head portion 42 is rectangular, as illustrated in FIG. 3B. The receptacle 311 is similarly rectangular. That is to say, the form of the receptacle 311 is configured to allow passage of the optionally compressed or narrowed head portion 42. In principle, a different geometry of the head portion 42 and the receptacle 311 is also conceivable and possible. As an example, the receptacle 311 can have a circular form and the head portion 42 can have a round form.

In addition, the mounting element 4 may include a shank portion 41 which is screwed to the door skin 1. For mounting on the door skin 1, the door skin 1 may include a through-hole 11 and the shank portion 41 may include a threaded portion 412 with a thread. The threaded portion 412 is screwed on the door skin 1 into the through-hole 11 in order to fix the carrier component 2 to the door skin 1.

For assembly, the carrier component 2 is punctured by the mounting element 4 for the purpose of mounting on the door skin 1, as a result of which an aperture 21 is created in the carrier component 2. In order to enable puncturing of the carrier component 2, the thread of the mounting element 4 is formed as self-tapping. Moreover, the mounting element 4 tapers toward an end located opposite the head portion 42. In the assembled door assembly, that end of the mounting element 4 which is located opposite the head portion 42 protrudes through the door skin 1.

The carrier component 2 is mounted on the door skin 1 by way of the mounting element 4, wherein the carrier component 2 bears against the door skin 1 with the one side. A shoulder 411 of the mounting element 4 bears against the other side of the carrier component 2, with the result that the carrier component 2 is fixed between the door skin 1 and the mounting element 4. The shoulder 411 is arranged along a connection axis D, which extends along the mounting element 4 from the head portion 42 over the shank portion 41. In the embodiment illustrated, the shoulder 411 is characterized by a reduction in size of the cross-sectional form of the shank portion 41 along the connection axis D proceeding from the head portion 42. Proceeding from the threaded portion 412, the shoulder 411 is consequently characterized by an enlargement of the cross-sectional form of the shank portion 41. The shoulder 411 extends orthogonal to the connection axis D.

For fixing the interior panel component 3 to the head portion 42, in the variant embodiment of FIG. 3A the shoulder 411 is in the form of a disk-shaped enlargement of the cross-sectional form of the shank portion 41. In principle, the enlargement can have any desired geometric form. The interior panel component 3 is fixed between the head portion 42 and the shoulder 411, while the carrier component 2 is fixed between the door skin 1 and the shoulder 411. As an alternative, it can be provided that the one side of the carrier component 2 bears against the door skin 1 and the other side of said carrier component bears against the interior panel component 3.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

1 Door skin
11 Through-hole

2 Carrier component
21 Aperture
3 Interior panel component
31 Latching portion
311 Receptacle
4 Mounting element
41 Shank portion
411 Shoulder
412 Threaded portion
42 Head portion
42a, 42b Latching hooks While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A door assembly comprising:
a door skin;
a carrier component supported by the door skin; and
an interior panel component wherein the carrier component is mounted on the door skin by at least one mounting element, and wherein the at least one mounting element mounts the interior panel component in that the at least one mounting element protrudes on the carrier component by way of a head portion to which the interior panel component is fixed, and wherein the at least one mounting element includes a shank portion connected in a positively locking and/or non-positively locking manner to the door skin and the shank portion creates an aperture in the carrier component when the carrier component is being mounted on the door skin, and wherein the head portion includes at least one elastically deformable latching element that fixes the interior panel component to the carrier component.

2. The door assembly as claimed in claim 1, wherein the head portion is connected in a positively locking or non-positively locking manner to the interior panel component.

3. The door assembly as claimed in claim 2, wherein the interior panel component has a latching portion mechanically latched to the head portion of the at least one mounting element.

4. The door assembly as claimed in claim 1, wherein the head portion is T-shaped in a cross section.

5. The door assembly as claimed in claim 1, wherein the at least one latching element is formed by a latching hook.

6. The door assembly as claimed in claim 1, wherein the at least one latching element is formed by a plastic clip which has been molded on.

7. The door assembly as claimed in claim 1, wherein a plurality of mounting elements are arranged on a circumferential edge of the carrier component.

8. The door assembly as claimed in claim 1, wherein the shank portion includes a threaded portion having threads screwed to the door skin.

9. The door assembly as claimed in claim 8, wherein the threads of the threaded portion are self-tapping threads.

10. The door assembly as claimed in claim 1, wherein the shank portion has a shoulder disposed against the carrier component.

11. The door assembly as claimed in claim 10, wherein the shoulder includes a disk-shaped enlargement that is larger than the shank portion in cross section.

12. The door assembly as claimed in claim 11, wherein the interior panel component is disposed against the shoulder.

* * * * *